United States Patent
Cermak

(10) Patent No.: US 7,850,530 B2
(45) Date of Patent: Dec. 14, 2010

(54) OUTER JOINT PART OF A CONSTANT VELOCITY UNIVERSAL JOINT FOR A WHEEL HUB-JOINT-UNIT

(75) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 665 days.

(21) Appl. No.: 11/667,618

(22) PCT Filed: Oct. 14, 2005

(86) PCT No.: PCT/EP2005/011058

§ 371 (c)(1),
(2), (4) Date: Nov. 19, 2007

(87) PCT Pub. No.: WO2006/050784

PCT Pub. Date: May 18, 2006

(65) Prior Publication Data

US 2008/0238184 A1    Oct. 2, 2008

(30) Foreign Application Priority Data

Nov. 12, 2004   (DE)   .................. 10 2004 054 908

(51) Int. Cl.
*F16D 3/223*   (2006.01)
(52) U.S. Cl. ............................. 464/178; 464/906
(58) Field of Classification Search ............... 464/178, 464/906; 384/544
See application file for complete search history.

(56) References Cited

U.S. PATENT DOCUMENTS

| | | | |
|---|---|---|---|
| 5,052,979 A | 10/1991 | Welschof et al. | |
| 7,621,817 B2 * | 11/2009 | Cermak | ................. 464/178 |
| 2004/0171428 A1 | 9/2004 | Tajima et al. | |

FOREIGN PATENT DOCUMENTS

| | | |
|---|---|---|
| DE | 103 35 342 A1 | 3/2004 |
| DE | 103 38 172 B3 | 6/2005 |
| EP | 1 125 765 A2 | 8/2001 |

OTHER PUBLICATIONS

English Language Abstract of DE 203 20 496.
Machine Translation of DE20320496.

* cited by examiner

*Primary Examiner*—Greg Binda
(74) *Attorney, Agent, or Firm*—Rader, Fishman & Grauer PLLC

(57) ABSTRACT

An outer joint part of a constant velocity universal joint for a wheel hub-constant velocity fixed joint unit wherein a wheel hub (60, 90) with a through-aperture (59, 89) carrying inner shaft teeth (44, 74) is clamped relative to the outer joint part (46, 76) of a constant velocity universal joint (42, 72), to which outer joint part (46, 76) there is formed on a journal (53, 83) with outer shaft teeth (54, 84), wherein the inner shaft teeth (44, 74) of the through-aperture (59, 89) and the outer shaft teeth (54, 84) of the journal (53, 83) engage one another and wherein a double-row wheel bearing (43, 73) is slid on to the wheel hub (60, 90) which wheel bearing comprises an inner bearing race (64, 94) which directly supports an end face (52, 82) of the outer joint part (46, 76), wherein the ratio of the journal diameter at the journal base ($D_Z$) and the journal length ($L_Z$) is greater than 0.95.

7 Claims, 8 Drawing Sheets

FIG. 1 "PRIOR ART"

OUTER JOINT PART OF A CONSTANT VELOCITY UNIVERSAL JOINT FOR A WHEEL HUB-JOINT-UNIT

TECHNICAL FIELD

The invention relates to an outer joint part of a constant velocity universal joint for use in a wheel hub-constant velocity fixed joint unit wherein a wheel hub with a through-aperture carrying inner shaft teeth is clamped relative to the outer joint part of a constant velocity universal joint, to which outer joint part there is formed on a journal with outer shaft teeth, wherein the inner shaft teeth of the through-aperture and the outer shaft teeth of the journal engage one another and a double-row wheel bearing is slid on to the wheel hub which wheel bearing comprises an inner bearing race which directly supports an end face of the outer joint part.

BACKGROUND

Assemblies of this type are used for driven, more particularly steered wheels of motor vehicles, wherein the wheel and optionally a brake disc are threaded on to the flange of the wheel hub, whereas the constant velocity universal joint forms an integral part of a driveshaft (sideshaft) which consists of an intermediate shaft, an inner plunging joint and the constant velocity fixed joint mentioned here. The bearing assembly has to be inserted into a wheel carrier or a steering knuckle.

In prior art assemblies of said type, the purpose is that the dimensions of the wheel bearing should be as small as possible, both for cost reasons with reference to the wheel bearing and with reference to the size of the wheel carrier or steering knuckle. In view of the above considerations, the journal diameter at the outer joint part is given the required minimum strength, wherein the journal diameter at the same time determines the inner diameter of the wheel hub and thus indirectly, via the strength-related wall thickness of the hub, the inner diameter of the wheel bearing. Because of the elasticity of a journal designed in this way, changes in torque, more particularly torque thrusts passing through the assembly, lead to relative movements between the outer joint part and the inner bearing race at mutual abutment faces. This leads to the development of noise and also to fretting corrosion.

SUMMARY OF THE INVENTION

The present invention provides a new concept for an outer joint part of a constant velocity joint to be used in a unit of said type, which concept ensures a greater stiffness and shorter length and avoids the above-mentioned disadvantages. In accordance with the present invention, the objective is achieved by introducing qualitatively changed dimensions of the journal of the outer joint part, which journal is shown to be substantially shorter and thicker. As a result, the inner diameter of the wheel hub and thus indirectly the inner diameter of the wheel bearing can also be changed. An advantageous effect consists in that the center to center distance between the constant velocity fixed joint and the wheel bearing can be reduced.

The above-mentioned relative movements between the outer joint part and the inner bearing race are avoided or clearly reduced, the reason being the greater cross-section of the journal and thus the greater torsional strength on the one hand and the greater effective area for the mutual support between the outer joint part and the now larger inner bearing race on the other hand.

The qualitative change in the dimensions can be defined by different characteristic size ratios which qualitatively differ from previously used size ratios.

According to a first equation of the solution, it is proposed that the ratio of the journal diameter at the journal base $D_Z$ and the journal length $L_Z$ is greater than 0.95. More particularly, it is proposed that the ratio of the journal diameter at the journal base $D_Z$ and the journal length $L_Z$ is greater than 1.15, more particularly greater than 1.7.

In this embodiment, there is achieved a journal which is particularly rotationally stiff and has a particularly high bending stiffness in order to keep any rotational and bending deformation to a minimum, so that there are no or only extremely few relative movements between the bearing race and the joint abutment face.

According to a second equation of the solution it is proposed that the ratio of the diameter $D_A$ of the end face and the length $L_Z$ of the journal is greater than 2. More particularly it is proposed that the ratio of the diameter $D_A$ of the end face and the length $L_Z$ of the journal is greater than 2.5. As a result and in cooperation with the pretensioning force of the bolt, the torque transmissible at the abutment shoulder can be calculated to be such that the relative movement between the bearing race and the joint abutment face is prevented more effectively.

According to a third solution, the ratio of the diameter $D_A$ of the end face and the diameter $D_Z$ of the journal is smaller than 1.7. According to a preferred embodiment, it is proposed that the ratio of the diameter $D_A$ of the end face and the diameter $D_Z$ of the journal is smaller than 1.5. In this way, the relative movements between the bearing race and the joint abutment face which occur as a result of torsion in the teeth due a rotational play are reduced.

Finally, according to a further solution, the ratio of the distance $L_{GZ}$ between the centre of the outer joint part $M_G$ and the journal end on the one hand and the journal length $L_Z$ on the other hand is smaller than 2.2; more particularly, the ratio should be smaller than 2.0. In this way, the joint is moved into a position which is advantageous from the point of view of wheel kinetics.

All the above definitions depart from the prior art size ratios of the outer joint parts of said type and ensure a unit with steplike improved characteristics.

Furthermore, it is proposed that the journal comprises a central threaded bore into which there is threaded a bolt for clamping a wheel hub to the outer joint part.

BRIEF DESCRIPTION OF THE DRAWINGS

A preferred embodiment of wheel hub-joint-unit with an inventive outer joint part is compared to a unit with an outer joint part according to the state of the art in the drawings and will be described below.

FIG. 6 shows a unit of an inventive outer joint part of a constant velocity plunging joint, giving general reference numbers.

DETAILED DESCRIPTION OF THE DRAWINGS

Figure 1:
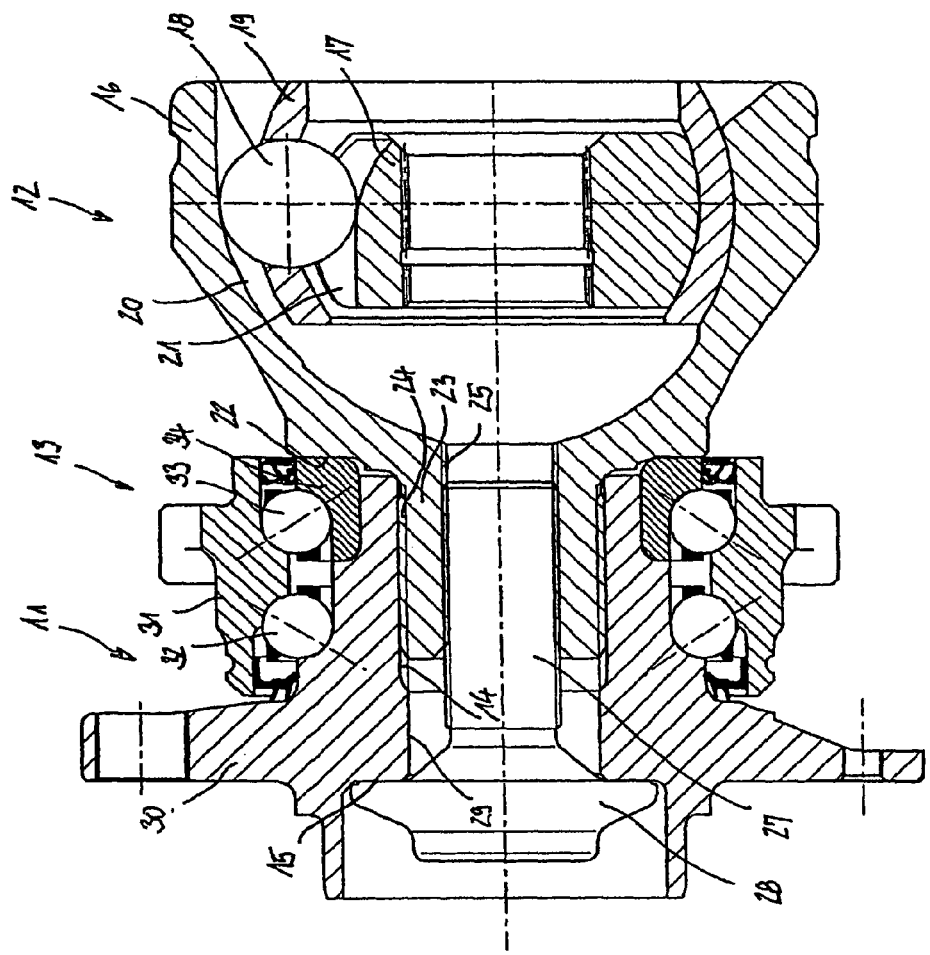
FIG. 1 shows a unit according to the state of the art in a longitudinal section, giving general reference numbers.
Figure 2:
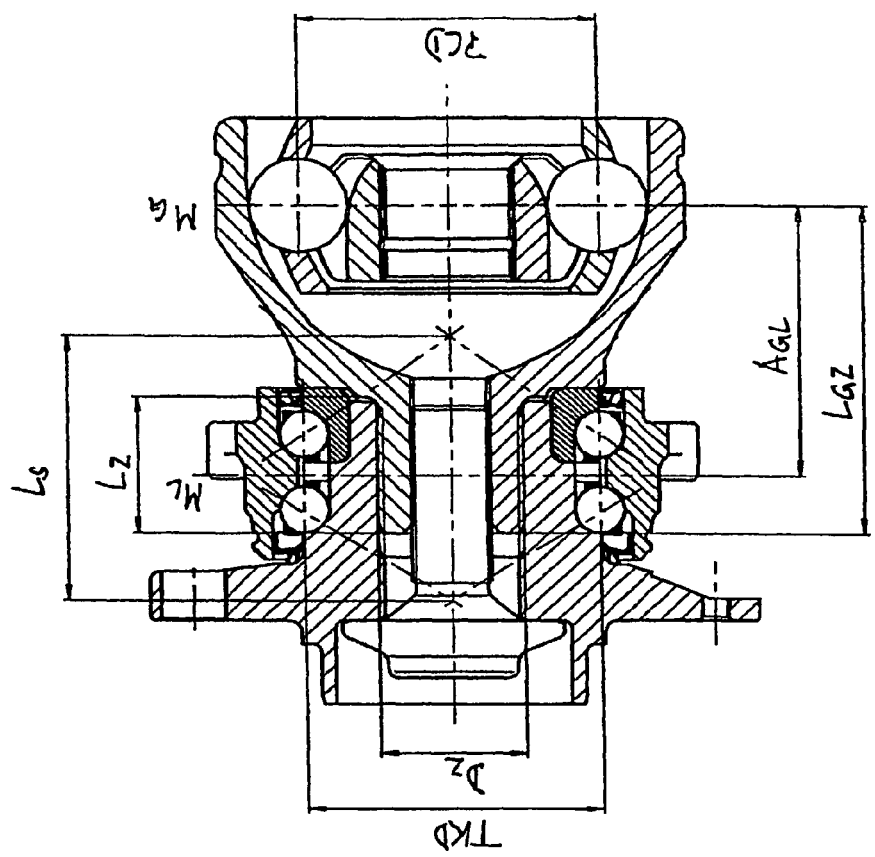
FIG. 2 shows the unit according to FIG. 1 with characteristic parameters.

FIGS. 1 and 2 each show a wheel hub unit 11 for a driving wheel of a motor vehicle, having a constant velocity fixed joint 12 for being connected to a driveshaft. The wheel hub unit 11 comprises a wheel hub 30 and a bearing unit 13, wherein the bearing unit 13 is slipped on to the wheel hub 30 and axially clamped in between the wheel hub 30 and the constant velocity fixed joint 12. The wheel hub 30 comprises a flange for threading on a wheel to which a brake disc can also be threaded. Furthermore, the wheel hub 30 comprises a through-aperture 29 into which there are formed inner shaft teeth from the joint end. A central, substantially radial supporting face 15 is formed in at the flange. The constant velocity fixed joint 12 is provided in the form of a UF joint (undercut-free joint) and comprises an outer joint part 16, an inner joint part 17, torque transmitting balls 18 and a ball cage 19. The balls are held and guided in pairs of outer ball tracks 20 in the outer joint part and inner ball tracks 21 in the inner joint part. At the outer joint part 16, at the wheel hub end, there is formed a substantially radial supporting face 22. Furthermore, a central journal 23 is attached at the outer joint part and carries outer shaft teeth 24 which engage the inner shaft teeth 14 of the hub. Furthermore, the journal is provided with a central threaded through-bore 25 into which there is threaded a bolt 27 which, by means of its bolt head 28, is supported on the radial supporting face 15 of the wheel hub 30. The double-row bearing 13 comprises an outer bearing race 31 which can be inserted into a wheel carrier and comprises outer bearing grooves (without reference numbers) for two rows of bearing balls 32, 33. A first inner bearing groove for the row of balls 32 is directly provided in the wheel hub 30, whereas a second ball groove for the second row of balls 33 is formed in a separate inner bearing race 34. The inner bearing race 34 axially projects from the wheel hub 30, so that the bearing assembly 13, with the help of the supporting face 22, can be pretensioned at the outer joint part by means of the bolt 27 supported on the supporting face 15. The assembly according to FIGS. 1 and 2 is designed to achieve a minimum pitch circle diameter TKD of the wheel bearing. The journal 23 comprises a minimum strength and, while having a relatively small journal diameter $D_Z$, comprises a long journal length $L_Z$. As a result, the distance between the design bearing center $M_L$ and the design joint center $M_G$ is increased; said distance has been given the reference symbol $A_{GL}$. The distance between the joint center and the journal end, which distance is also shown, has been given the reference symbol $L_{GZ}$. A further characteristic parameter as shown in FIG. 2 is the pitch circle diameter PCD of the joint. There is also shown the supporting length $L_S$ of the bearing which comprises a so-called O-configuration, with the effective lines of the balls being positioned on symmetric conical surfaces which open towards one another.

Figure 3:
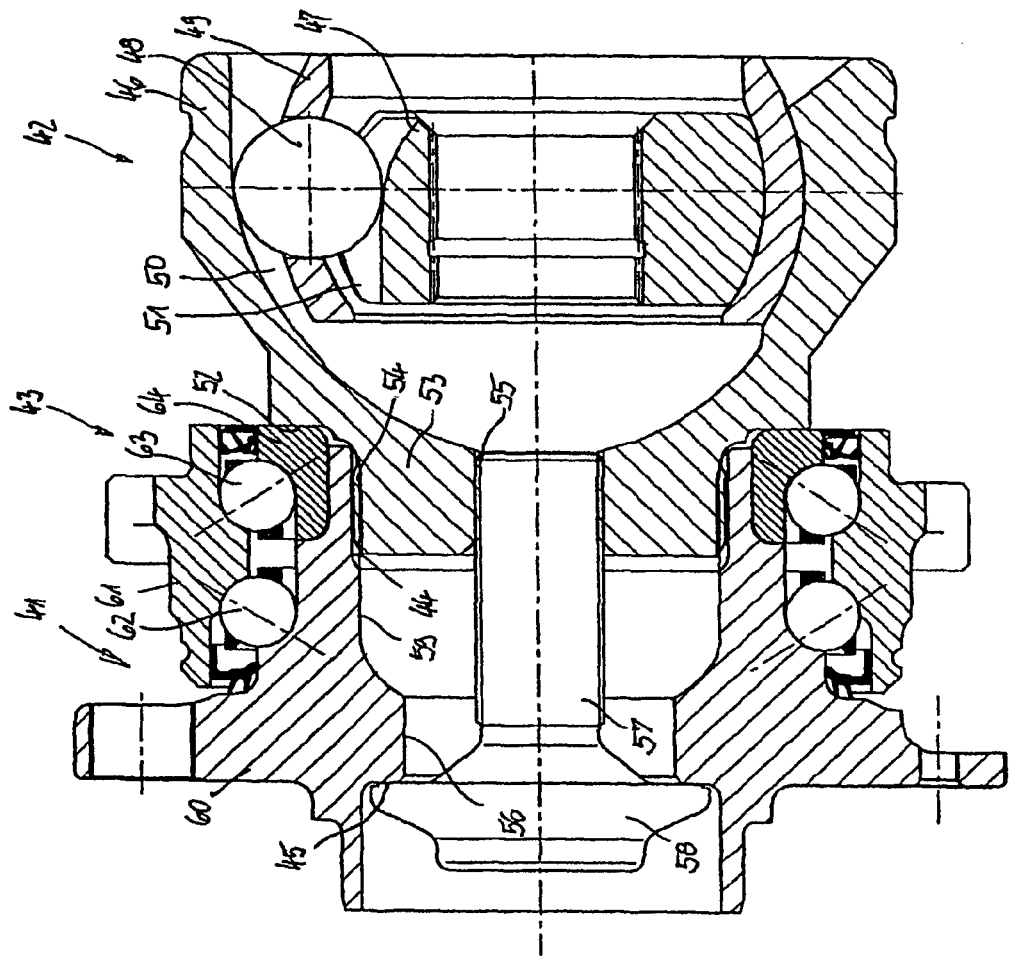
FIG. 3 shows a unit with an inventive outer joint part of a constant velocity fixed joint, giving general reference numbers.
Figure 4:
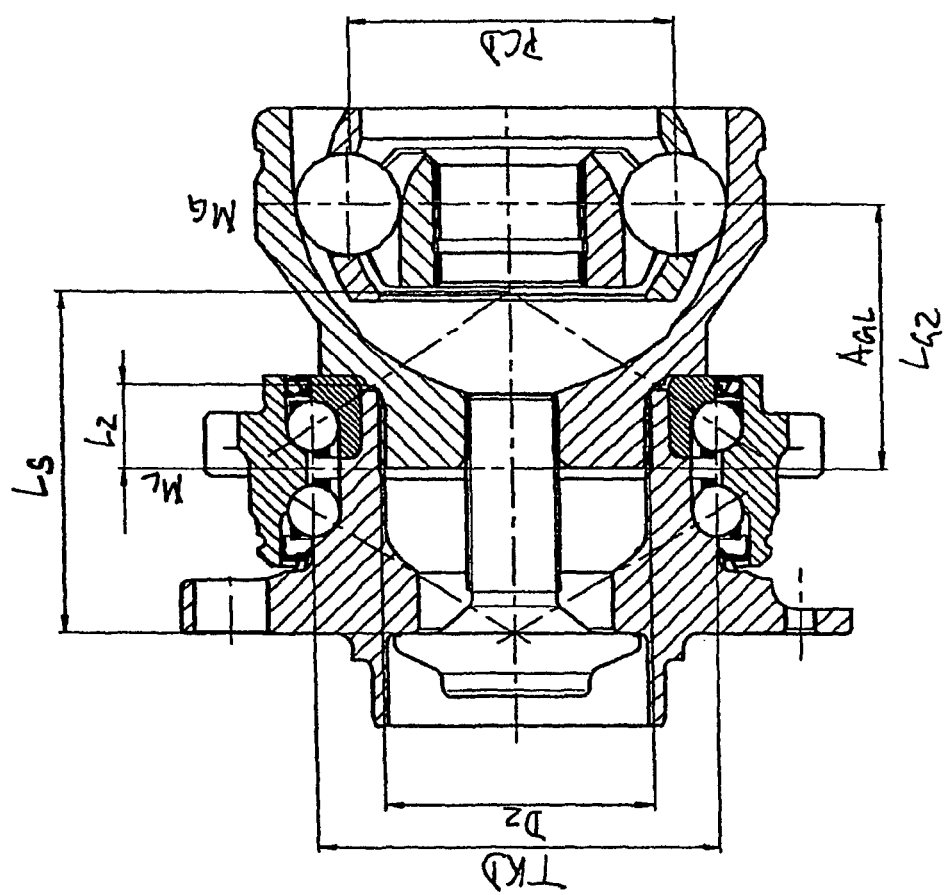
FIG. 4 shows a unit according to FIG. 3 with characteristic parameters.

FIGS. 3 and 4 each show a wheel hub unit 41 for a driving wheel of a constant velocity fixed joint 42 for being connected to a driveshaft. The constant velocity fixed joint comprises curved ball tracks 50, 51. The wheel hub unit 41 comprises a wheel hub 60 and a bearing unit 43, with the bearing unit 43 being slipped on the wheel hub 60 and axially clamped between the wheel hub 60 and the constant velocity fixed joint 42. The wheel hub 60 comprises a flange for threading on a wheel to which a brake disc can also be threaded. Furthermore, the wheel hub 60 comprises a through-aperture 59 into which inner shaft teeth 44 are formed from the joint end. A central, substantially radial supporting face 45 is formed in at the flange. The constant velocity fixed joint is provided in the form of a UF joint (undercut-free joint) and comprises an outer joint part 46, an inner joint part 47, torque transmitting balls 48 and a ball cage 49. The balls are held and guided in pairs of outer ball tracks 50 in the outer joint part and inner all tracks 51 in the inner joint part. At the outer joint part 46, at the wheel hub end, there is formed a substantially radial supporting face 52. Furthermore, at the outer joint part, there is attached a central journal 53 which carries outer shaft teeth 54 which engage the inner shaft teeth 44 of the hub. Furthermore, the journal is provided with a central threaded through-bore 55 into which there is threaded a bolt 57 which, by means of its bolt head 58, is supported on the radial supporting face 45 of the wheel hub 60. The supporting face 45 is formed in at a reduced diameter 56 of the through-aperture 59. The double-row bearing 43 comprises an outer bearing race 61 which can be inserted into a wheel carrier and comprises outer bearing grooves (without reference numbers) for two rows of a bearing balls 62, 63. A first inner bearing groove for the row of balls 62 is formed directly in the wheel hub 41, whereas a second ball groove for the second row of balls 63 is provided in a separate inner bearing race 64. The inner bearing race 64 axially projects from the wheel hub 41, so that the bearing assembly 43, with the assistance of the supporting face 52, can be pretensioned at the outer joint part by means of the bolt 57 supported on the supporting face 45. In the case of an inventive outer joint part as shown in FIGS. 3 and 4, there is permitted a qualitatively greater pitch circle diameter TKD of the bearing assembly, because for clearly reducing the distance $A_{GL}$ between the bearing centre $M_L$ and the joint centre $M_G$, there was put into effect a clear qualitative increase in the journal diameter $D_Z$. Said increase in the journal diameter $D_Z$ permits the journal length $L_Z$ to be shortened. The distance $L_{GZ}$ between the joint centre and the journal end is identical to $A_{GL}$. A ratio of the distance $L_{GZ}$ between the center of the outer joint part $M_G$ and the journal end, and the journal length $L_Z$ is less than 2.2. FIG. 4, too, shows further characteristic parameters to which reference was made in the description and in the claims, the pitch circle diameter PCD of the joint and the supporting length $L_S$ of the bearing assembly. In this case, the bearing comprises an O-configuration with effective lines of the balls which are positioned on symmetric conical surfaces which open towards one another.

As compared to the assembly according to FIGS. 1 and 2 wherein the diameter of the journal is reduced to a minimum, with the journal being rotationally soft, the assembly with the inventive embodiment according to FIGS. 3 and 4 shows a short, thick and thus rotationally stiff journal. The micro-movements which so far occurred under alternating torque conditions between the supporting face at the outer joint part and the respective counter face at the separate inner bearing race do not occur in the inventive joint.

Figure 5:
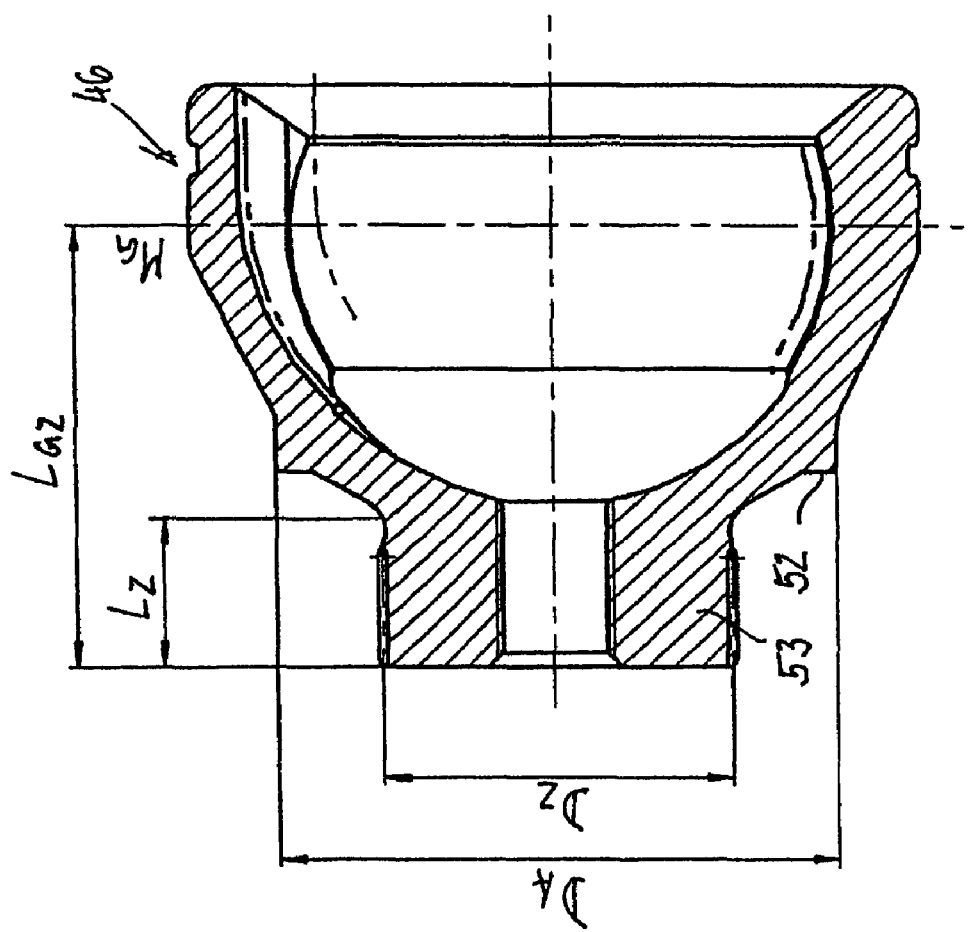
FIG. 5 shows an inventive outer joint part of a constant velocity fixed joint in the form of a detail with characteristic parameters.
Figure 9:
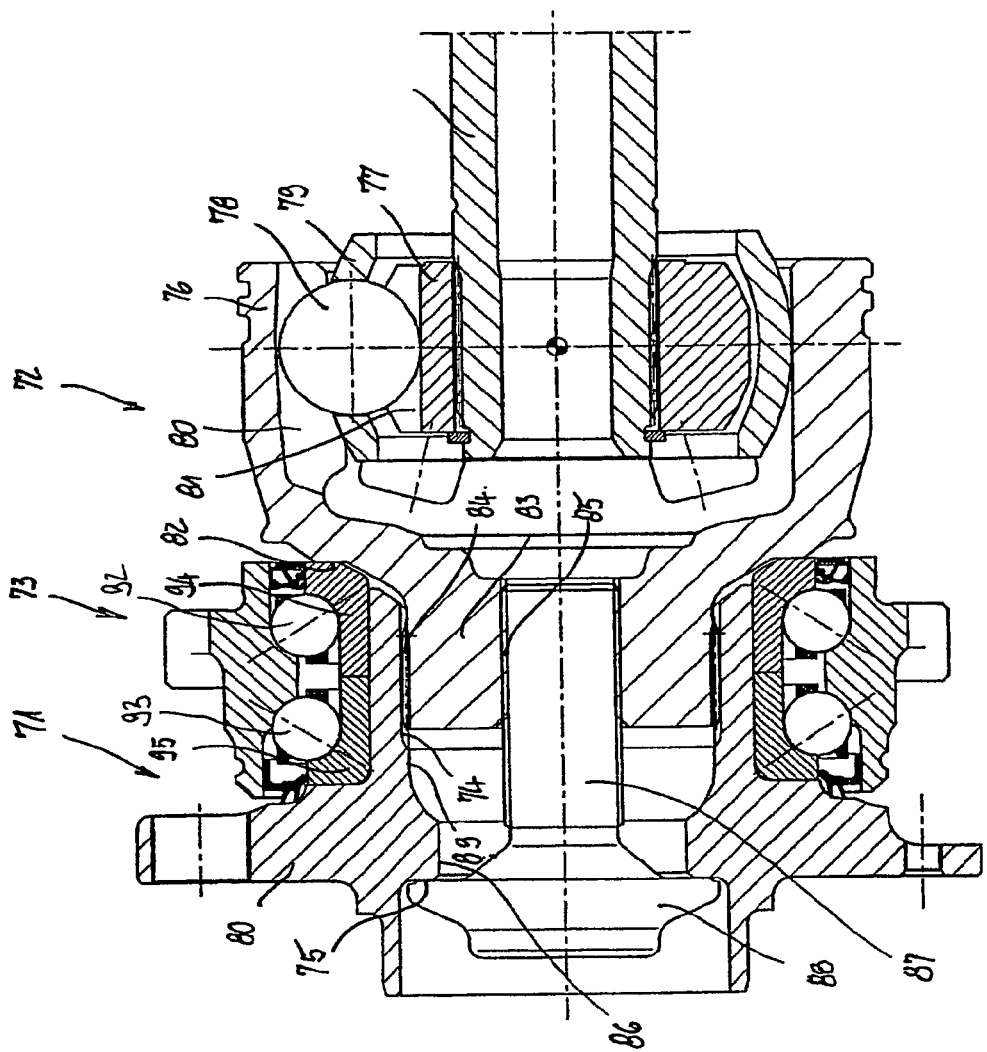

In FIG. 5, an inventive outer joint part 46 with a journal 53 and an end face or supporting face 52, is shown to comprise the parameters $L_{GZ}$ (distance between joint centre $M_G$ and the journal end), $L_Z$ (journal length), $D_A$ (diameter of end face) and $D_Z$ (journal diameter). Additionally, an effective tool length of the journal 53 substantially corresponds to the journal length ($L_Z$). A ratio of the diameter $D_A$ of the end face and the diameter $D_Z$ of the journal is less than 1.7, more particularly less than 1.5.

Figure 7:
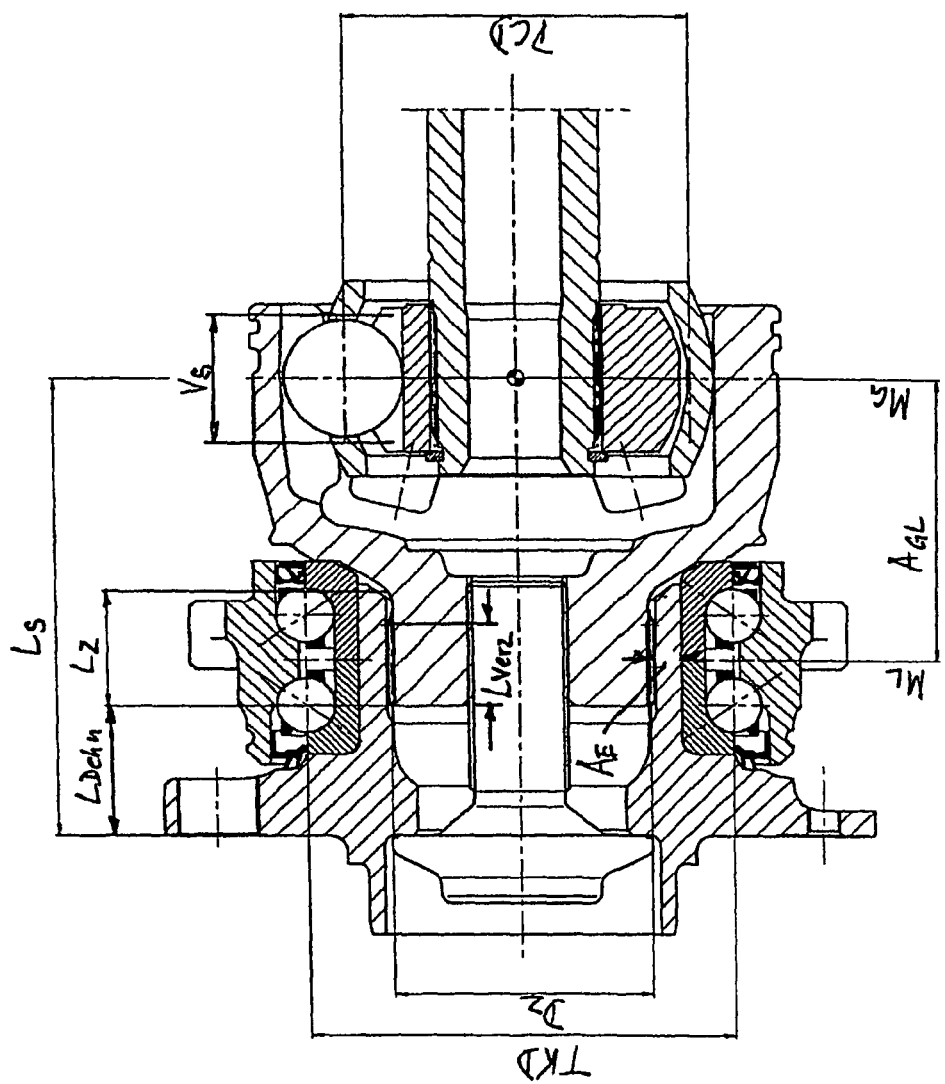
FIG. 7 shows the unit according to FIG. 6, giving characteristic parameters.
Figure 8:
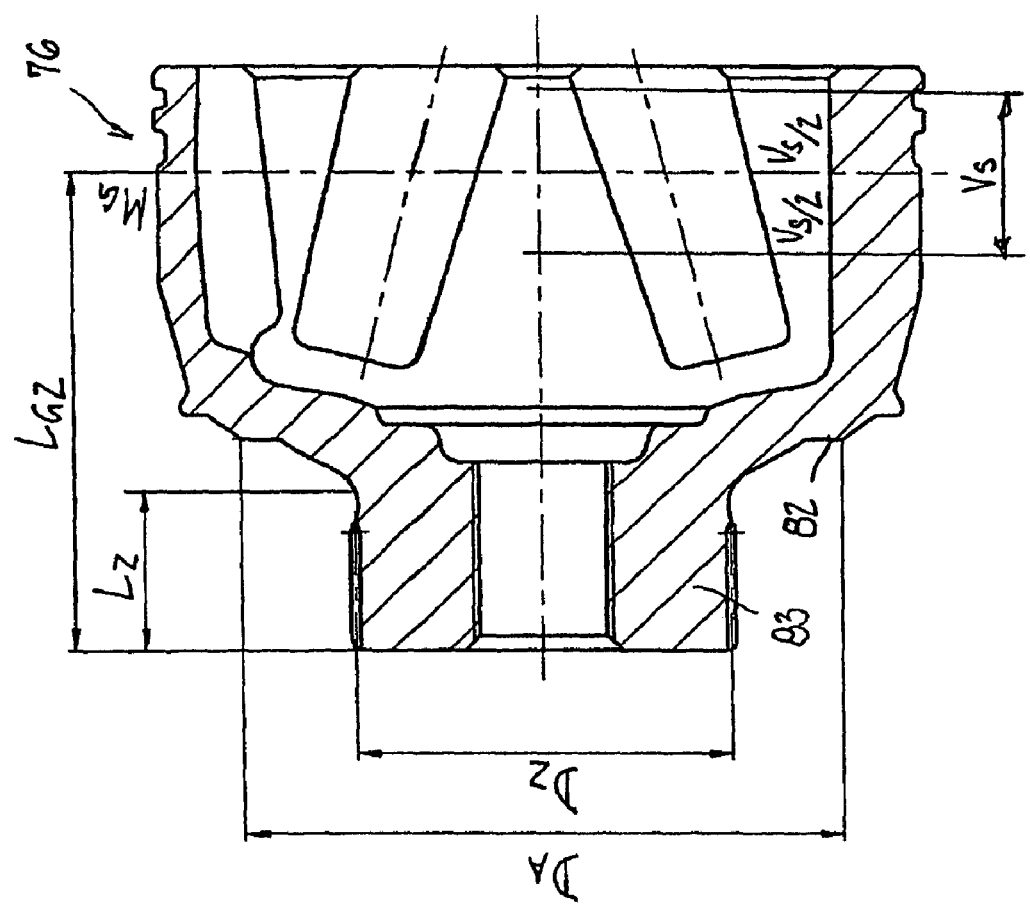
FIG. 8 shows an inventive outer joint part of a constant velocity plunging joint in the form of a detail, giving characteristic parameters.

FIGS. 6 and 7 each show a wheel hub unit 71 for a driving wheel of a motor vehicle with a constant velocity plunging joint 72 for being connected to a driveshaft, wherein a bearing unit 73 is slid on to the wheel hub unit 71 and axially clamped between the wheel hub unit 71 and the constant velocity plunging joint 72. FIG. 6 illustrates a constant velocity joint 72 with straight ball tracks 80, 81. The wheel hub 90 comprises a flange for threading on a wheel to which a brake disc can also be threaded. Furthermore, the wheel hub 90 comprises a through-aperture 89 into which, from the joint end, there are formed inner shaft teeth 74. At the flange, there is formed a central, substantially radial supporting face 75. The constant velocity plunging joint 72 is provided in the form of a VL joint (Löbro plunging joint) and comprises an outer joint part 76, an inner joint part 77, torque transmitting balls 78 and a ball cage 79. The balls are held and guided in pairs of outer ball tracks 80 in the outer joint part 76 and inner ball tracks 81 in the inner joint part. At the outer joint part 76, at the wheel hub end, there is formed a substantially radial supporting face 82. Furthermore, at the outer joint part, there is attached a central journal 83 which carries outer shaft teeth 84 which engage the inner shaft teeth 74 of the hub. Furthermore, the journal is provided with a central threaded through-bore 85 into which there is threaded a bolt 87 which, by means of its bolt head 88, is supported on the radial supporting face 75 of the wheel hub 90. The supporting face 75 is formed in at a reduced diameter 86 of the through-aperture 89. The double-row bearing 73 comprises an outer bearing race 91 which can be inserted into a wheel carrier and comprises outer bearing grooves (without reference numbers) for two rows of a bearing balls 92, 93. A first inner bearing groove for the row of balls 92 is formed in an inner bearing race 94, whereas a second ball groove for the second row of balls 93 is provided in an inner bearing race 95. The inner bearing race 94 axially projects from the wheel hub 90, so that the bearing assembly 73, with the assistance of the supporting face 82, can be pretensioned at the outer joint part by means of the bolt 87 supported on the supporting face 75. In the case of an inventive outer joint part as shown in FIGS. 5 and 6, there is permitted a qualitatively greater pitch circle diameter TKD of the bearing assembly, because for clearly reducing the distance $A_{GL}$ between the bearing centre $M_L$ and the joint centre $M_G$, there was put into effect a clear qualitative increase in the journal diameter $D_Z$. Said increase in the journal diameter $D_Z$ permits the journal length $L_Z$ to be shortened. FIG. 8, too, shows further characteristic parameters to which reference was made in the description and in the claims, the pitch circle diameter PCD of the joint and the supporting length $L_S$ of the bearing assembly. Reference is also made to the elongation length $L_{DEHN}$ of the bolt and to the annular cross-sectional area $A_E$ of the wheel hub underneath the separate inner bearing races. The joint centre $M_G$ is positioned centrally between the displacement path halves $V_S/2$ centered on either side thereof. In this case, too, the bearing comprises an O-configuration with effective lines of the balls which are positioned on symmetric conical surfaces which open towards one another.

As compared to the assembly according to FIGS. 1 and 2 wherein the diameter of the journal is reduced to a minimum, with the journal being rotationally soft, the assembly with the inventive embodiment according to FIGS. 6 and 7 shows a short, thick and thus rotationally stiff journal. The micro-movements which so far occurred under alternating torque conditions between the supporting face at the outer joint part and the respective counter face at the separate inner bearing race do not occur in the inventive joint.

In FIG. 8, an inventive outer joint part 76 with a journal 83 and an end face or supporting face 82, is shown to comprise the parameters $L_{GZ}$ (distance between joint centre $M_G$ and the journal end), $L_Z$ (journal length), $D_A$ (diameter of end face) and $D_Z$ (journal diameter). Furthermore, FIG. 8 shows the displacement path $V_S$ whose axial center defines the joint center $M_G$.

| List of reference numbers | |
|---|---|
| 11, 41, 71 | wheel hub unit |
| 12, 42, 72 | constant velocity universal joint |
| 13, 43, 73 | wheel bearing |
| 14, 44, 74 | inner shaft teeth |
| 15, 45, 75 | supporting face (wheel hub) |
| 16, 46, 76 | outer joint part |
| 17, 47, 77 | inner joint part |
| 18, 48, 78 | ball |
| 19, 49, 79 | ball cage |
| 20, 50, 80 | outer ball track |
| 21, 51, 81 | inner ball track |
| 22, 52, 82 | supporting face (outer joint part) |
| 23, 53, 83 | journal |
| 24, 54, 84 | outer shaft teeth |
| 25, 55, 85 | threaded bore |
| 56, 86 | reduced diameter |
| 27, 57, 87 | bolt |
| 28, 58, 88 | bolt head |
| 29, 59, 89 | through-aperture |
| 30, 60, 90 | wheel hub |
| 31, 61, 91 | outer bearing race |
| 32, 62, 92 | row of balls |
| 33, 63, 93 | row of balls |
| 34, 64, 94 | inner bearing race |
| 95 | inner bearing race |
| TKD | pitch circle diameter of bearing |
| $D_Z$ | journal diameter |
| $L_Z$ | journal length |
| $M_L$ | bearing centre |
| $M_G$ | joint centre |
| $A_{GL}$ | distance between bearing centre & joint centre |
| $L_{GZ}$ | distance between joint centre & journal end |
| PCD | pitch circle diameter of joint |
| $L_S$ | supporting length of bearing |
| $V_S$ | displacement path |
| $A_E$ | cross-sectional area of wheel hub |
| $L_{DEHN}$ | elongation length of bolt shank |

The invention claimed is:

1. A wheel hub-constant velocity joint assembly, comprising:
   a wheel hub with a through-aperture carrying inner shaft teeth clamped relative to an outer joint part of a constant velocity universal joint, to which outer joint part there is formed on a journal with outer shaft teeth, wherein the inner shaft teeth of the through-aperture and the outer shaft teeth of the journal engage one another; and
   a double-row wheel bearing slid on to the wheel hub, the wheel bearing comprising an inner bearing race which directly supports an end face of the outer joint part, wherein a ratio of the diameter ($D_A$) of the end face and the diameter ($D_Z$) of the journal is less than 1.6.

2. An assembly according to claim 1, wherein the ratio of the diameter ($D_A$) of the end face and the diameter ($D_Z$) of the journal is less than 1.5.

3. An assembly according to claim 1, wherein the journal comprises a central threaded bore into which it is possible to thread a bolt for tensioning the wheel hub relative to the outer joint part.

4. An assembly according to claim 1, wherein an effective tooth length of the journal substantially corresponds to the journal length ($L_Z$).

5. An assembly according to claim 1, wherein the constant velocity universal joint is a fixed type joint and comprises curved ball tracks.

6. An assembly according to claim 1, wherein the constant velocity universal joint is a plunging type joint and comprises straight ball tracks.

7. A wheel hub-constant velocity joint assembly, comprising:

- a wheel hub with a through-aperture carrying inner shaft teeth clamped relative to an outer joint part of a constant velocity universal joint, to which outer joint part there is formed on a journal with outer shaft teeth, wherein the inner shaft teeth of the through-aperture and the outer shaft teeth of the journal engage one another; and
- a double-row wheel bearing slid on to the wheel hub, the wheel bearing comprising an inner bearing race which directly supports an end face of the outer joint part,
- wherein a ratio of the distance ($L_{GZ}$) between the center of the outer joint part ($M_G$) and the journal end, and the journal length ($L_Z$) is less than 2.2.

* * * * *